(12) United States Patent
Lin et al.

(10) Patent No.: US 10,218,270 B1
(45) Date of Patent: Feb. 26, 2019

(54) POWER CONVERTER

(71) Applicant: National Chi Nan University, Puli, Nantou (TW)

(72) Inventors: Yo-Sheng Lin, Puli (TW); Yang-Yun Lai, Puli (TW)

(73) Assignee: NATIONAL CHI NAN UNIVERSITY, Puli, Nantou (TW)

( * ) Notice: Subject to any disclaimer, the term of this patent is extended or adjusted under 35 U.S.C. 154(b) by 0 days.

(21) Appl. No.: 16/052,027

(22) Filed: Aug. 1, 2018

(30) Foreign Application Priority Data

May 3, 2018 (TW) .............................. 107115057 A

(51) Int. Cl.
*H02M 3/157* (2006.01)
*H02M 1/08* (2006.01)
*H02M 3/158* (2006.01)
*H02M 1/00* (2006.01)

(52) U.S. Cl.
CPC ............. *H02M 3/157* (2013.01); *H02M 1/08* (2013.01); *H02M 3/158* (2013.01); *H02M 3/1588* (2013.01); *H02M 2001/0003* (2013.01)

(58) Field of Classification Search
CPC .... H02M 3/157; H02M 3/158; H02M 3/1588; H02M 1/08; H02M 2001/0003
See application file for complete search history.

(56) References Cited

U.S. PATENT DOCUMENTS

| | | | |
|---|---|---|---|
| 2009/0174262 A1* | 7/2009 | Martin | H02M 3/157 307/82 |
| 2013/0249517 A1* | 9/2013 | Shiraishi | G05F 1/468 323/283 |
| 2015/0236595 A1* | 8/2015 | Babazadeh | H02M 3/1584 323/272 |
| 2018/0041125 A1* | 2/2018 | Vinciarelli | H02M 3/1582 |

* cited by examiner

*Primary Examiner* — Kyle J Moody
(74) *Attorney, Agent, or Firm* — Birch, Stewart, Kolasch & Birch, LLP

(57) ABSTRACT

A power converter includes a power conversion circuit converting an input voltage into an output voltage, and a feedback control circuit including a voltage detector module generating a feedback signal having a signal frequency proportional to a magnitude of the output voltage, a phase detector module generating counting-up and counting-down signals based on the signal frequency and a reference frequency, and a control input generator module controlling the power conversion circuit to adjust the output voltage based on the counting-up and counting-down signals. The logic levels of the counting-up and counting-down signals are maintained until a relative relationship between the signal frequency and the reference frequency changes.

11 Claims, 10 Drawing Sheets

POWER CONVERTER

CROSS-REFERENCE TO RELATED APPLICATION

This application claims priority of Taiwanese Invention Patent Application No. 107115057, filed on May 3, 2018.

FIELD

The disclosure relates to a power converter, and more particularly to a power converter that includes a feedback circuit for adjusting an output voltage of the power converter.

BACKGROUND

FIG. 1 shows a conventional power converter that includes a power conversion circuit 10 to convert an input voltage ($V_{in}$) into an output voltage ($V_{out}$), and a digital controller 20 to adjust the output voltage ($V_{out}$). The digital controller 20 includes a comparator 21 receiving the output voltage ($V_{out}$) and a reference voltage ($V_{ref}$) to generate an error voltage signal (e), an analog-to-digital converter (ADC) 22 to convert the error voltage signal (e) into an error digital signal (e[n:0]), a digital compensator 23 to generate a compensation signal (d[m:0]) based on the error digital signal (e[n:0]) for compensation of the difference between the output voltage ($V_{out}$) and the reference voltage ($V_{ref}$), and a digital pulse width modulator 24 to generate a pulse width modulation (PWM) signal based on the compensation signal (d[m:0]) to control operations of transistors (PMOS, NMOS) of the power conversion circuit 10. To improve power consumption and operation efficiency of power converters is a goal in the relevant industry.

SUMMARY

Therefore, an object of the disclosure is to provide a power converter that may have low power consumption and good operation efficiency.

According to the disclosure, the power converter includes a power conversion circuit and a feedback control circuit. The power conversion circuit is disposed to receive a control input and an input voltage, and is configured to convert the input voltage into an output voltage that has a magnitude relating to the control input. The feedback control circuit includes a voltage detector module, a phase detector module and a control input generator module. The voltage detector module is coupled to the power conversion circuit for receiving the output voltage therefrom, and is configured to generate a feedback signal having a frequency proportional to the magnitude of the output voltage. The phase detector module is coupled to the voltage detector module for receiving the feedback signal therefrom, and is disposed to receive a reference signal having a reference frequency. The phase detector module is configured to generate, when the reference frequency is higher than the frequency of the feedback signal, a counting-up signal at a first logic level and a counting-down signal at a second logic level that is different from the first logic level, where the counting-up signal remains at the first logic level and the counting-down signal remains at the second logic level until the reference frequency becomes not higher than the frequency of the feedback signal. The phase detector module is further configured to generate the counting-up signal at the second logic level and the counting-down signal at the first logic level when the reference frequency is lower than the frequency of the feedback signal, where the counting-up signal remains at the second logic level and the counting-down signal remains at the first logic level until the reference frequency becomes not lower than the frequency of the feedback signal. The control input generator module is coupled to the phase detector module for receiving the counting-up signal and the counting-down signal therefrom, and is configured to generate the control input based on the counting-up signal and the counting-down signal.

Another object of the disclosure is to provide a feedback control circuit that is used with a power conversion circuit to form a power converter and that may contribute to low power consumption and good operation efficiency of the power converter, where the power conversion circuit is configured to convert an input voltage into an output voltage that has a magnitude relating to a control input received thereby.

The feedback control circuit includes a voltage detector module, a phase detector module and a control input generator module. The voltage detector module is coupled to the power conversion circuit for receiving the output voltage therefrom, and is configured to generate a feedback signal having a frequency proportional to the magnitude of the output voltage. The phase detector module is coupled to the voltage detector module for receiving the feedback signal therefrom, and is disposed to receive a reference signal having a reference frequency. The phase detector module is configured to generate, when the reference frequency is higher than the frequency of the feedback signal, a counting-up signal at a first logic level and a counting-down signal at a second logic level that is different from the first logic level, where the counting-up signal remains at the first logic level and the counting-down signal remains at the second logic level until the reference frequency becomes not higher than the frequency of the feedback signal. The phase detector module is further configured to generate the counting-up signal at the second logic level and the counting-down signal at the first logic level when the reference frequency is lower than the frequency of the feedback signal, where the counting-up signal remains at the second logic level and the counting-down signal remains at the first logic level until the reference frequency becomes not lower than the frequency of the feedback signal. The control input generator module is coupled to the phase detector module for receiving the counting-up signal and the counting-down signal therefrom, and is configured to generate the control input based on the counting-up signal and the counting-down signal.

Yet another object of the disclosure is to provide a phase detector for use in a power converter that is configured to convert an input voltage into an output voltage that has a magnitude which is adjustable in relation to a counting-up signal and a counting-down signal. The phase detector may contribute to low power consumption and good operation efficiency of the power converter.

According to this disclosure, the phase detector includes a first D flip-flop, a second D flip-flop, a third D flip-flop, a fourth D flip-flop, a first NOT gate, a second NOT gate, and a NAND gate. The first D flip-flop has an input terminal disposed to receive a signal at a first logic level, a clock terminal disposed to receive a reference signal, a reset terminal, and an output terminal. The first NOT gate has an input terminal coupled to the clock terminal of the first D flip-flop, and an output terminal. The second D flip-flop has an input terminal disposed to receive a signal at the first logic level, a clock terminal disposed to receive a target signal, a reset terminal coupled to the reset terminal of the first D flip-flop, and an output terminal. The second NOT gate has an input terminal coupled to the clock terminal of the second D flip-flop, and an output terminal. The third D flip-flop has an input terminal coupled to the output terminal of the first D flip-flop, a clock terminal coupled to the output terminal of the first NOT gate, and an output terminal at which a counting-up signal is provided. The fourth D flip-flop has an input terminal coupled to the output terminal of the second D flip-flop, a clock terminal coupled to the output terminal of the second NOT gate, and an output terminal at which a counting-down signal is provided. The NAND gate has a first input terminal coupled to the output terminal of the first D flip-flop, a second input terminal coupled to the output terminal of the second D flip-flop, and an output terminal coupled to the reset terminal of the first D flip-flop.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
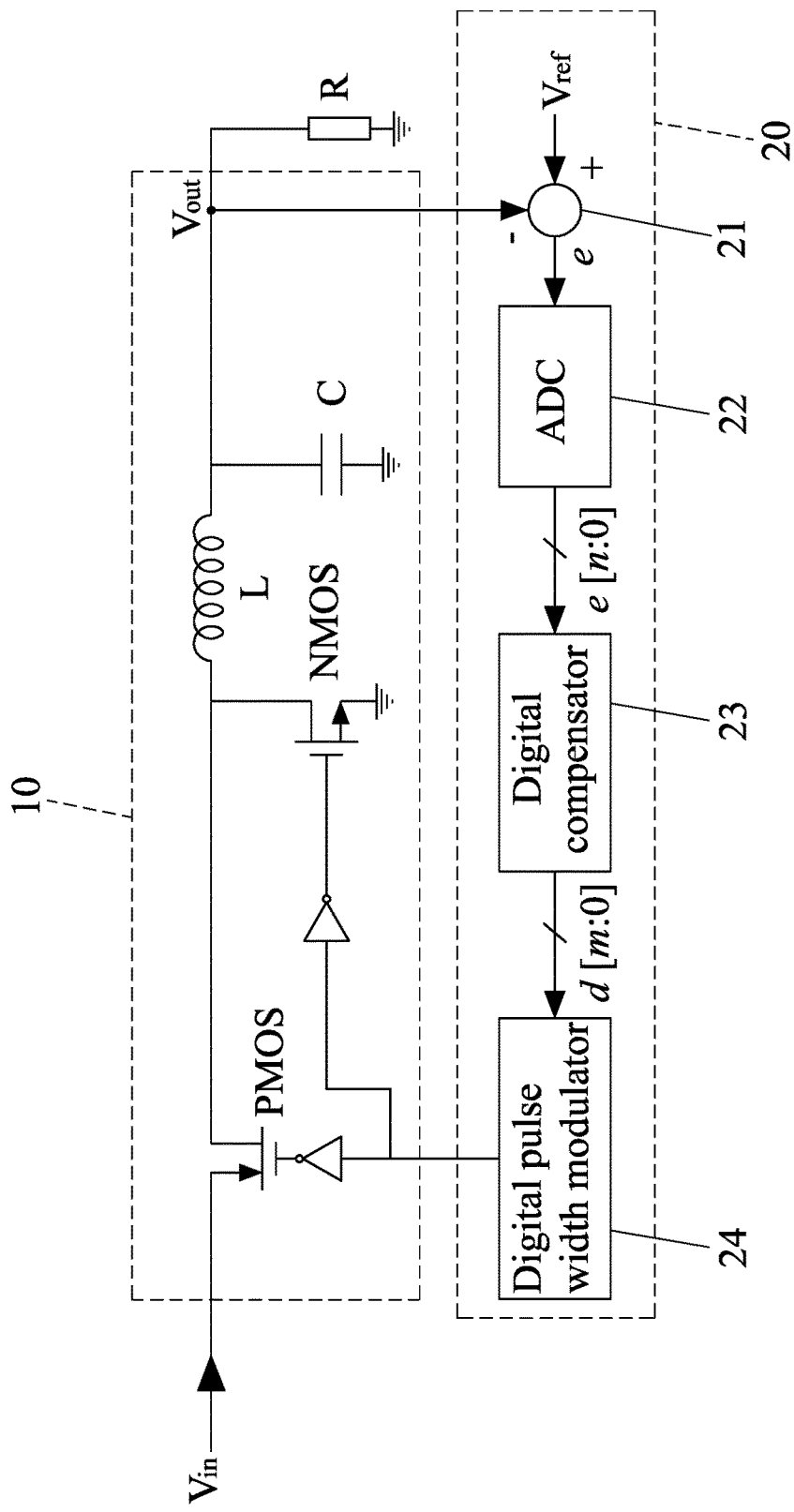
FIG. 1 is a schematic circuit block diagram illustrating architecture of a conventional power converter.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
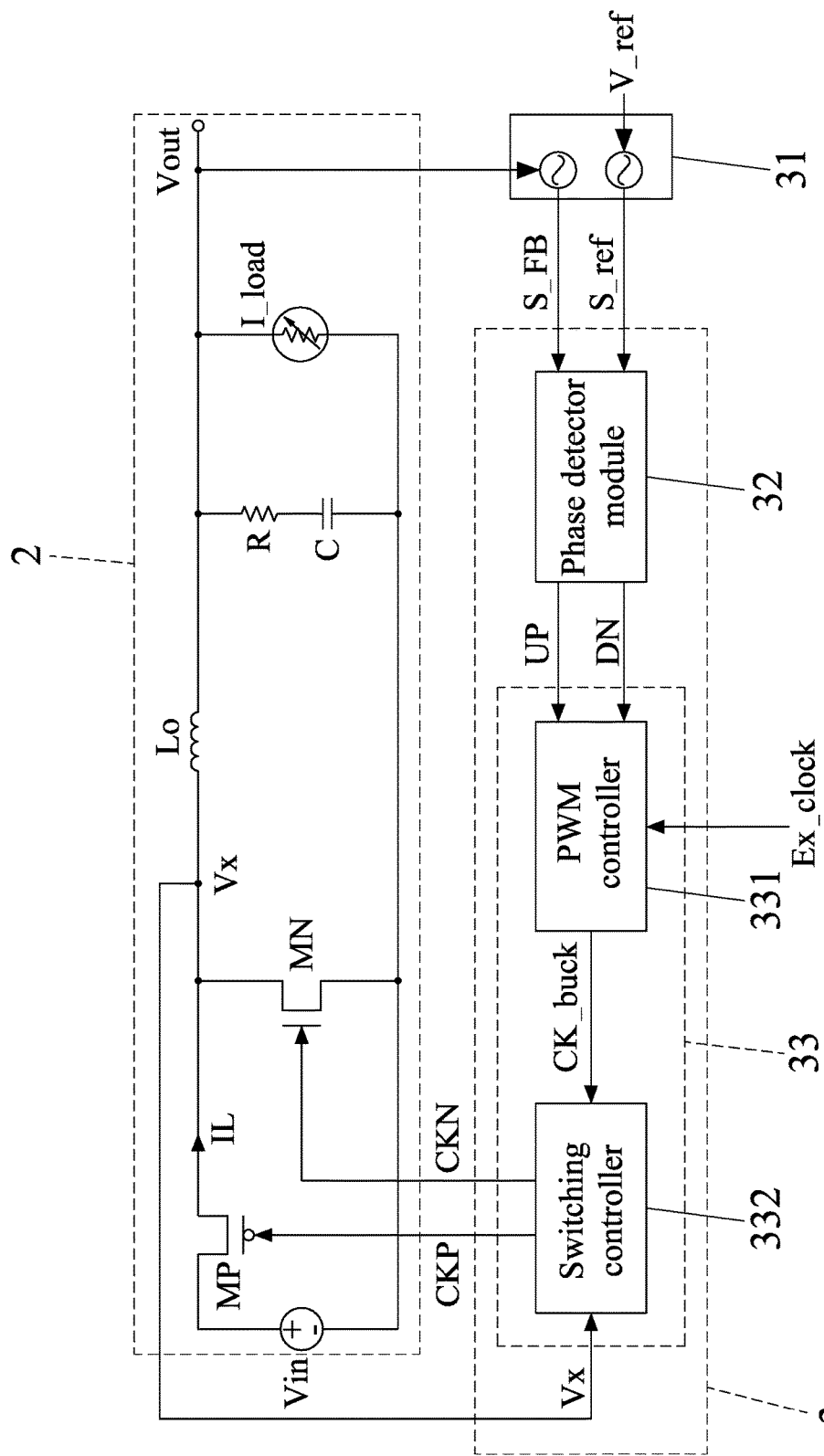
FIG. 2 is a schematic circuit diagram illustrating an embodiment of a power converter according to this disclosure.

Referring to FIG. 2, the embodiment of the power converter according to this disclosure includes a power conversion circuit 2 and a feedback control circuit 3.

The power conversion circuit 2 receives a control input that includes a first control signal (CKP) and a second control signal (CPN), and an input voltage (Vin), and is configured to convert the input voltage (Vin) into an output voltage (Vout) that has a magnitude relating to the control input. In this embodiment, the power conversion circuit 2 includes a first switch (MP) controlled using the first control signal (CKP), a second switch (MN) controlled using the second control signal (CKN), and an inductor (Lo). The first switch (MP) is a P-type metal-oxide-semiconductor field-effect transistor (MOSFET) having a gate terminal receiving the first control signal (CKP), a source terminal coupled to a positive terminal of a power source for receiving the input voltage (Vin), and a drain terminal. The second switch (MN) is an N-type MOSFET having a gate terminal receiving the second control signal (CKN), a source terminal coupled to a negative terminal of the power source, and a drain terminal coupled to the drain terminal of the first switch (MP). The inductor (Lo) has a first terminal coupled to the drain terminal of the first switch (MP), and a second terminal providing the output voltage (Vout).

The feedback control circuit 3 includes a voltage detector module 31, a phase detector module 32 and a control input generator module 33.

The voltage detector module 31 includes a first voltage controlled oscillator (VCO) and a second VCO. The first VCO receives the output voltage (Vout), and converts the output voltage (Vout) into a feedback signal (S_FB) having a frequency proportional to the magnitude of the output voltage (Vout). The second VCO receives a reference voltage (V_ref), and converts the reference voltage (V_ref) into a reference signal having a frequency (reference frequency) proportional to a magnitude of the reference voltage (V_ref).

Figure 3:
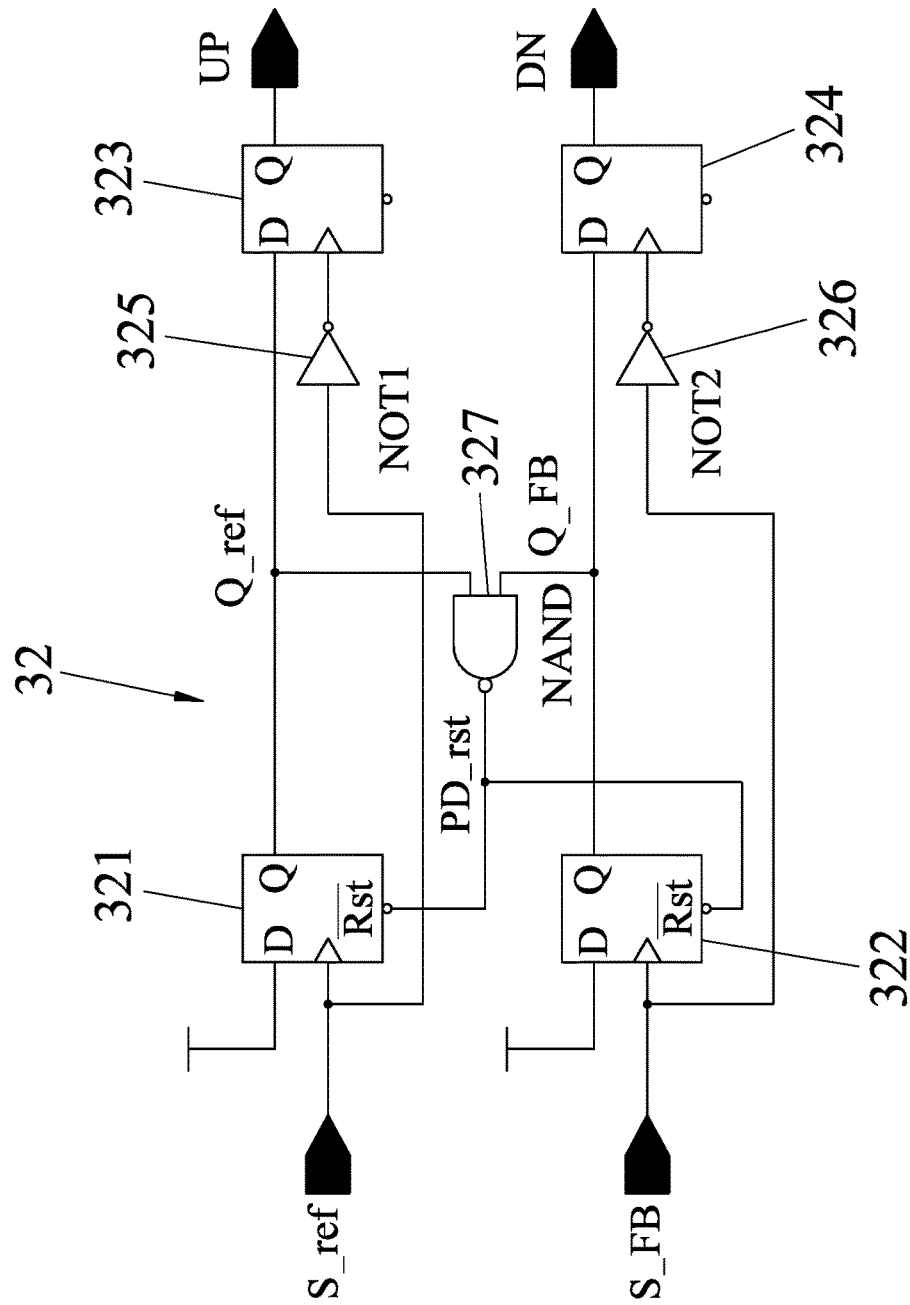
FIG. 3 is a schematic circuit diagram illustrating a phase detector module of the embodiment.

Referring to FIG. 3, the phase detector module 32 is coupled to the first and second VCOs for respectively receiving the feedback signal (S_FB) and the reference signal (S_ref) therefrom, and is configured to generate a counting-up signal (UP) and a counting-down signal (DN) based on the frequencies of the feedback signal (S_FB) and the reference signal (S_ref). The phase detector module 32 is configured to, when the reference frequency is higher than the frequency of the feedback signal (S_FB), generate the counting-up signal (UP) at a first logic level (e.g., a logic high level in this embodiment) and the counting-down signal (DN) at a second logic level (e.g., a logic low level in this embodiment) that is different from the first logic level, where the counting-up signal (UP) remains at the first logic level and the counting-down signal (DN) remains at the second logic level until the reference frequency becomes not higher than the frequency of the feedback signal (S_FB). In other words, the counting-up signal (UP) is always at the first logic level and the counting-down signal (DN) is always at the second logic level whenever the reference frequency is higher than the frequency of the feedback signal (S_FB). The phase detector module 32 is further configured to generate the counting-up signal (UP) at the second logic level and the counting-down signal (DN) at the first logic level when the reference frequency is lower than the frequency of the feedback signal (S_FB), where the counting-up signal (UP) remains at the second logic level and the counting-down signal (DN) remains at the first logic level until the reference frequency becomes not lower than the frequency of the feedback signal (S_FB). In other words, the counting-up signal (UP) is always at the second logic level and the counting-down signal (DN) is always at the first logic level whenever the reference frequency is lower than the frequency of the feedback signal (S_FB).

In this embodiment, the phase detector module 32 includes four D flip-flop 321-324, two NOT gates 325, 326, and a NAND gate 327.

The D flip-flop 321 has an input terminal receiving a signal at the first logic level, a clock terminal coupled to the second VCO for receiving the reference signal (S_ref) therefrom, a reset terminal, and an output terminal at which a signal (Q_ref) is outputted. The D flip-flop 321 updates the signal (Q_ref) to have a logic level the same as that of the signal at the input terminal thereof at every rising edge of the signal provided to the clock terminal thereof when a signal at the reset terminal thereof is at the logic high level, and resets the signal (Q_ref) to the logic low level when the signal at the reset terminal thereof is at the logic low level.

The NOT gate 325 has an input terminal coupled to the clock terminal of the D flip-flop 321, and an output terminal.

The D flip-flop 323 has an input terminal coupled to the output terminal of the D flip-flop 321, a clock terminal coupled to the output terminal of the NOT gate 325, and an output terminal at which the counting-up signal (UP) is provided. The D flip-flop 323 updates the counting-up signal (UP) to have a logic level the same as that of the signal at the input terminal thereof (i.e., the signal (Q_ref)) at every rising edge of the signal provided to the clock terminal thereof (i.e., the inversed reference signal (S_ref)).

The D flip-flop 322 has an input terminal receiving a signal at the first logic level, a clock terminal coupled to the first VCO for receiving the feedback signal (S_FB) therefrom, a reset terminal coupled to the reset terminal of the D flip-flop 321, and an output terminal at which a signal (Q_FB) is outputted. The D flip-flop 322 updates the signal (Q_FB) to have a logic level the same as that at the input terminal thereof at every rising edge of the signal provided to the clock terminal thereof (i.e., the feedback signal (S_FB)) when a signal at the reset terminal thereof is at the logic high level, and resets the signal (Q_ref) to the logic low level when the signal at the reset terminal thereof is at the logic low level.

The NOT gate 326 has an input terminal coupled to the clock terminal of the D flip-flop 322, and an output terminal.

The D flip-flop 324 has an input terminal coupled to the output terminal of the D flip-flop 322, a clock terminal coupled to the output terminal of the NOT gate 326, and an output terminal at which the counting-down signal (DN) is provided. The D flip-flop 324 updates the counting-down signal (DN) to have a logic level the same as that of the signal at the input terminal thereof (i.e., the signal (Q_FB)) at every rising edge of the signal provided to the clock terminal thereof (i.e., the inversed feedback signal (S_FB)).

The NAND gate 327 has a first input terminal coupled to the output terminal of the D flip-flop 321, a second input terminal coupled to the output terminal of the D flip-flop 322, and an output terminal coupled to the reset terminals of the D flip-flops 321, 322 and outputting a signal (PD_rst).

Because the time points of triggers for the cascaded D flip-flops 321, 323 are separated by half the period of the reference signal (S_ref), and the time points of triggers for the cascaded D flip-flops 322, 324 are separated by half the period of the feedback signal (S_FB), undesired changes for the counting-up signal (UP) and the counting-down signal (DN) due to delay of signal transmission may be avoided, achieving greater reliability of the circuit operation.

Figure 4:
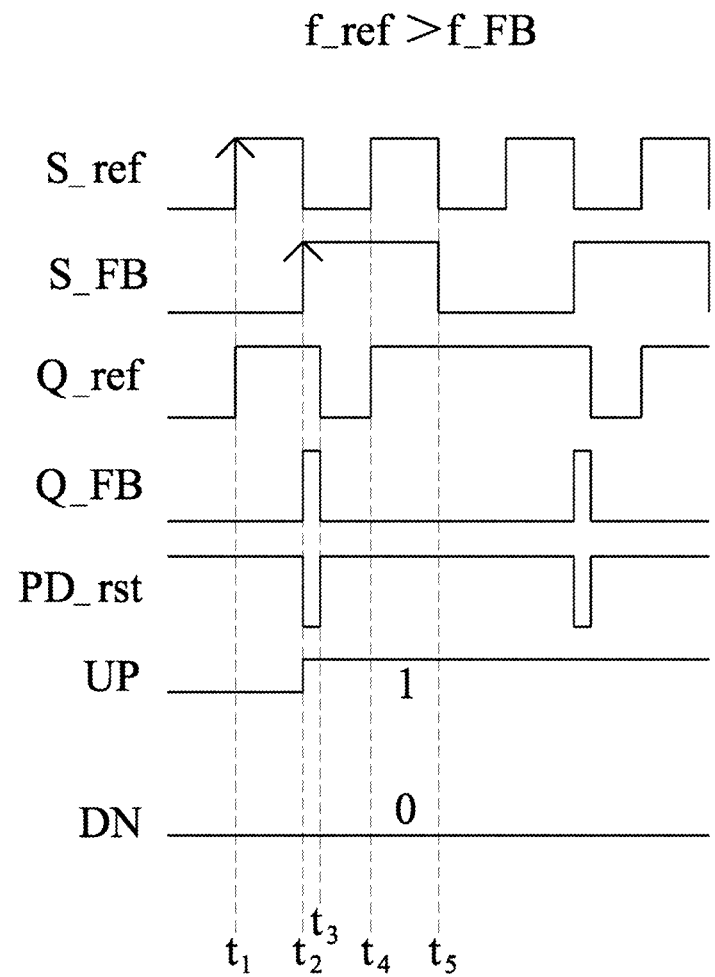
FIGS. 4 to 6 are timing diagrams illustrating operation of the phase detector module under different conditions.
Figure 5:
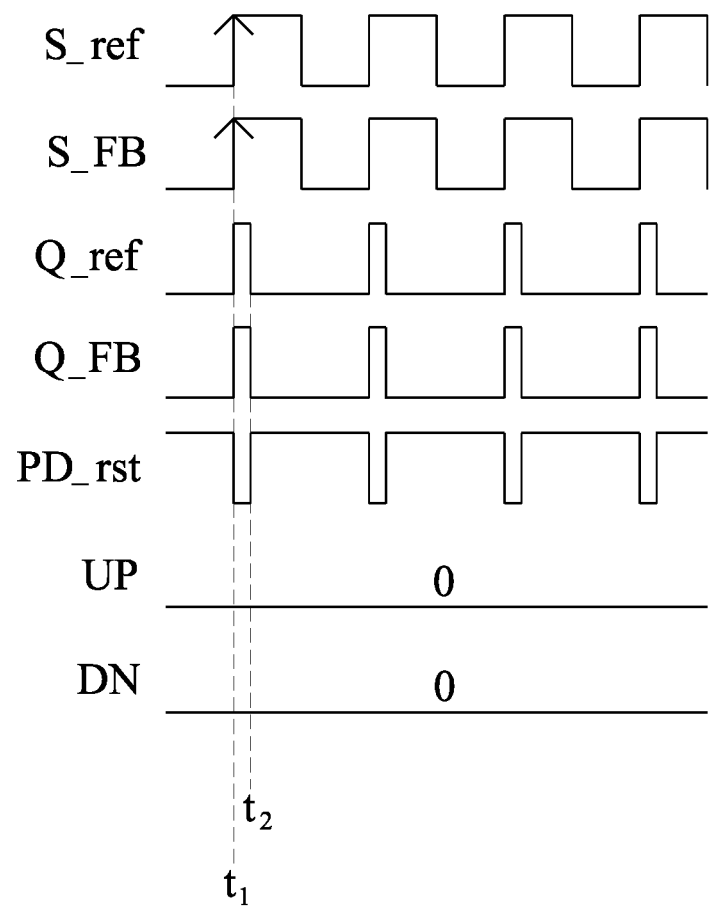
Figure 6:
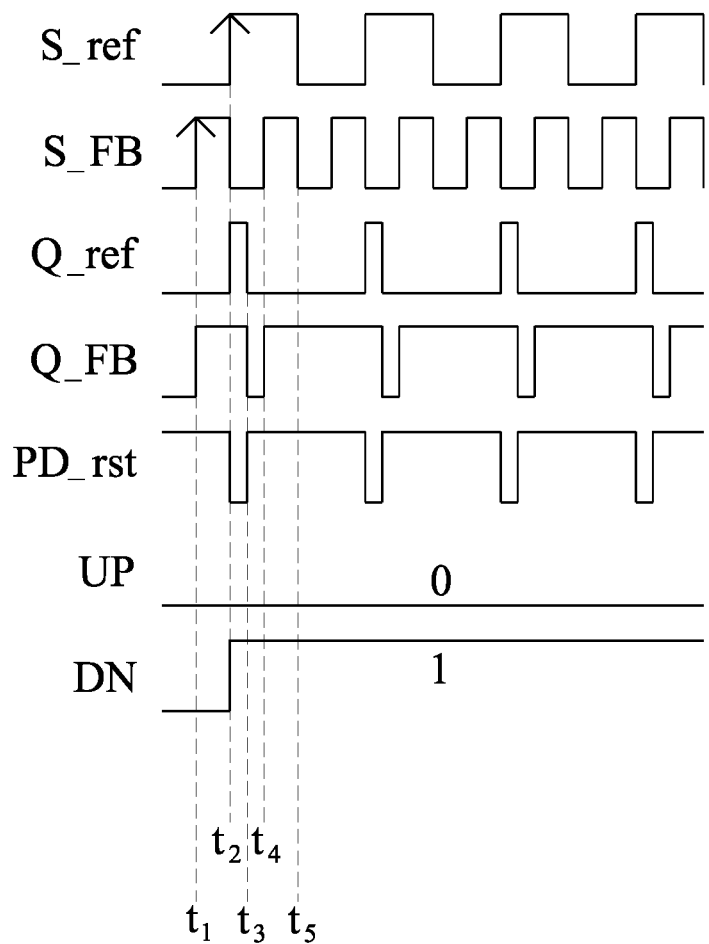

FIGS. 4 to 6 exemplarily illustrate waveforms of the signals (S_ref, S_FB, Q_ref, Q_FB, PD_rst, UP, DN) under different conditions with respect to the frequencies of the reference signal (S_ref) and the feedback signal (S_FB), where f_ref represents the frequency of the reference signal (S_ref), and f_FB represents the frequency of the feedback signal (S_FB).

In the condition of f_ref>f_FB as exemplified in FIG. 4, the signal (Q_ref) becomes logic high at a time point ($t_1$) that corresponds to a rising edge of the reference signal (S_ref). The counting-up signal (UP) becomes logic high and the signal (Q_FB) become logic high at a time point ($t_2$) that corresponds to both of a falling edge of the reference signal (S_ref) and a rising edge of the feedback signal (S_FB). At this time, because the signal (Q_ref) and the signal (Q_FB) are both logic high, the signal (PD_rst) is changed to logic low, so that both of the signal (Q_ref) and the signal (Q_FB) will be reset to logic low within a short time. As a result, both of the signal (Q_ref) and the signal (Q_FB) become logic low at a time point ($t_3$), causing the signal (PD_rst) to return to logic high, while the counting-up signal (UP) remains logic high because of the characteristic of the D flip-flop 323, which only changes the output thereof (i.e., the counting-up signal (UP)) at rising edges of the signal provided to the clock terminal thereof (i.e., the falling edges of the reference signal (S_ref) in this embodiment because the clock terminal is provided with the inversed reference signal). The signal (Q_ref) becomes logic high again at a time point ($t_4$) that corresponds to a rising edge of the reference signal (S_ref), so the counting-up signal (UP) is still logic high at a time point ($t_5$) that corresponds to a falling edge of the reference signal (S_ref). By such operational logic, the signal (Q_ref) is logic high at every falling edge of the reference signal (S_ref) and the signal (Q_FB) is logic low at every falling edge of the feedback signal (S_FB), so the counting-up signal (UP) remains logic high and the counting-down signal (DN) remains logic low as long as the frequency of the reference signal (S_ref) remains higher than the frequency of the feedback signal (S_FB) (i.e., f_ref>f_FB).

In the condition of f_ref=f_FB as exemplified in FIG. 5, both of the signal (Q_ref) and the signal (Q_FB) become logic high at a time point ($t_1$) that corresponds to a rising edge of each of the reference signal (S_ref) and the feedback signal (S_FB). Accordingly, the signal (PD_rst) changes to logic low, so that both of the signal (Q_ref) and the signal (Q_FB) will be reset to logic low within a short time. As a result, both of the signal (Q_ref) and the signal (Q_FB) become logic low at a time point ($t_2$), causing the signal (PD_rst) to return to logic high. By such operational logic, the signal (Q_ref) and the signal (Q_FB) are always logic low at every falling edge of the reference signal (S_ref) and every falling edge of the feedback signal (S_FB), so the counting-up signal (UP) and the counting-down signal (DN) remain logic low as long as the frequency of the reference signal (S_ref) remains equal to the frequency of the feedback signal (S_FB) (i.e., f_ref=f_FB).

In the condition of f_ref<f_FB as exemplified in FIG. 6, the signal (Q_FB) becomes logic high at a time point ($t_1$) that corresponds to a rising edge of the feedback signal (S_FB). The counting-down signal (DN) becomes logic high and the signal (Q_ref) becomes logic high at a time point ($t_2$) that corresponds to both of a falling edge of the feedback signal (S_FB) and a rising edge of the reference signal (S_ref). At this time, because the signal (Q_ref) and the signal (Q_FB) are both logic high, the signal (PD_rst) changes to logic low, so that both of the signal (Q_ref) and the signal (Q_FB) will be reset to logic low within a short time. As a result, both of the signal (Q_ref) and the signal (Q_FB) become logic low at a time point ($t_3$), causing the signal (PD_rst) to return to logic high, while the counting-down signal (DN) remains logic high because of the characteristic of the D flip-flop 324, which only changes the output thereof (i.e., the counting-down signal (DN)) at rising edges of the signal provided to the clock terminal thereof (i.e., the falling edges of the feedback signal (S_FB) in this embodiment because the clock terminal is provided with the inversed feedback signal). The signal (Q_FB) becomes logic high again at a time point ($t_4$) that corresponds to a rising edge of the feedback signal (S_FB), so the counting-down signal (DN) is still logic high at a time point ($t_5$) that corresponds to a falling edge of the feedback signal (S_FB). By such operational logic, the signal (Q_FB) is logic high at every falling edge of the feedback signal (S_FB) and the signal (Q_ref) is logic low at every falling edge of the reference signal (S_ref), so the counting-down signal (DN)

remains logic high and the counting-up signal (UP) remains logic low as long as the frequency of the reference signal (S_ref) remains lower than the frequency of the feedback signal (S_FB) (i.e., f_ref<f_FB).

By virtue of the proposed configurations, the logic levels of the counting-up signal (UP) and the counting-down signal (DN) will not change until a relative relationship between the frequencies of the reference signal (S_ref) and the feedback signal (S_FB) changes, reducing power consumption that may occur in the switching of the logic level of each of the counting-up signal (UP) and the counting-down signal (DN), and promoting efficiency of the feedback control circuit 3.

Figure 7:
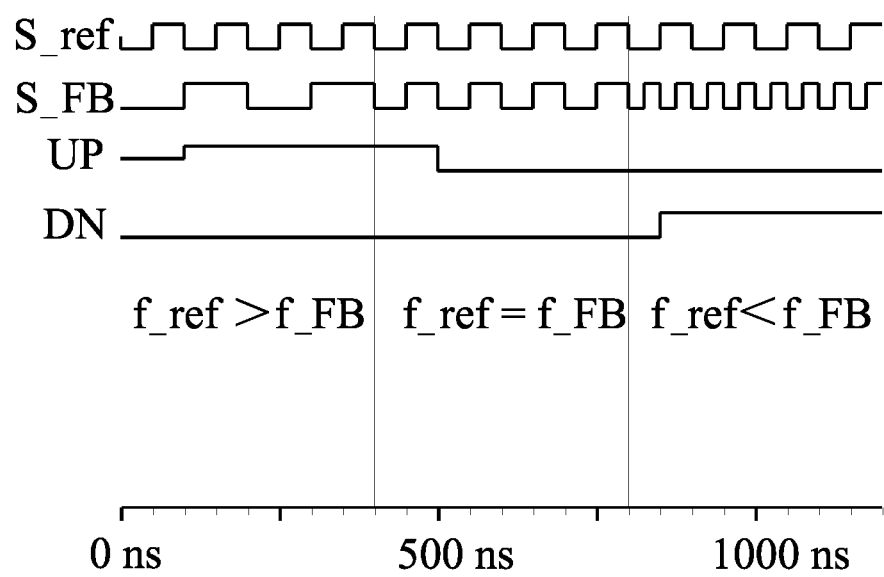
FIG. 7 is a timing diagram illustrating an exemplary operation of the phase detector module.

FIG. 7 exemplarily shows how the logic levels of the counting-up signal (UP) and the counting-down signal (DN) change in response to frequency changes of the feedback signal (S_FB), which reflects changes of the output voltage (Vout) of the power conversion circuit 2.

Figure 8:
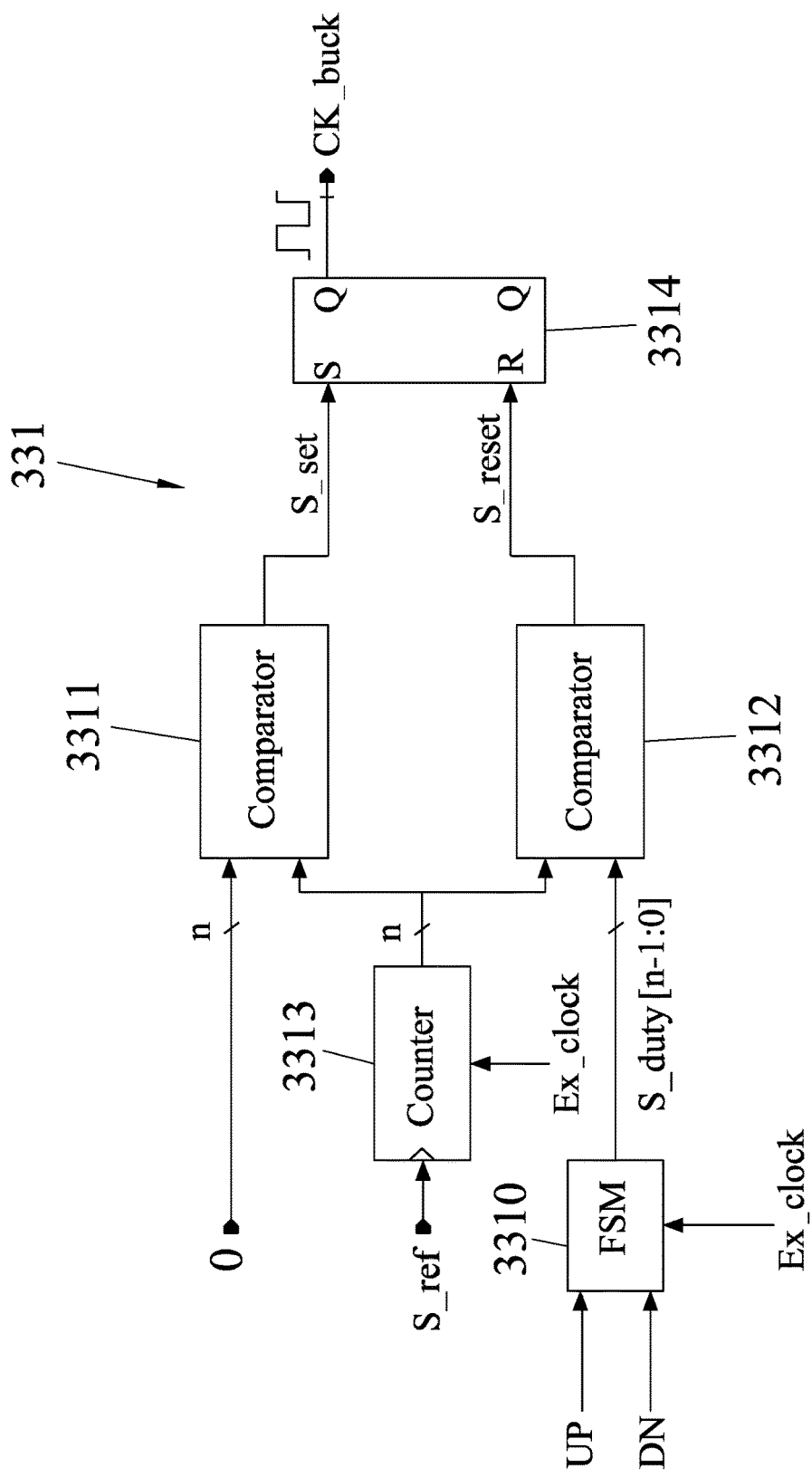
FIG. 8 is a schematic circuit diagram illustrating a pulse width modulation (PWM) controller of the embodiment.

Referring to FIG. 2 again, the control input generator module 33 includes a pulse width modulation (PWM) controller 331 and a switching controller 332. The PWM controller 331 is coupled to the phase detector module 32 for receiving the counting-up signal (UP) and the counting-down signal (DN) therefrom, receives a clock signal (Ex_clock), and is configured to generate a PWM signal (CK_buck) based on the counting-up signal (UP), the counting-down signal (DN) and the clock signal (Ex_clock). Further referring to FIG. 8, the PWM controller 331 includes a finite state machine (FSM) 3310, two comparators 3311, 3312, a counter 3313, and an SR latch 3314.

Figure 9:
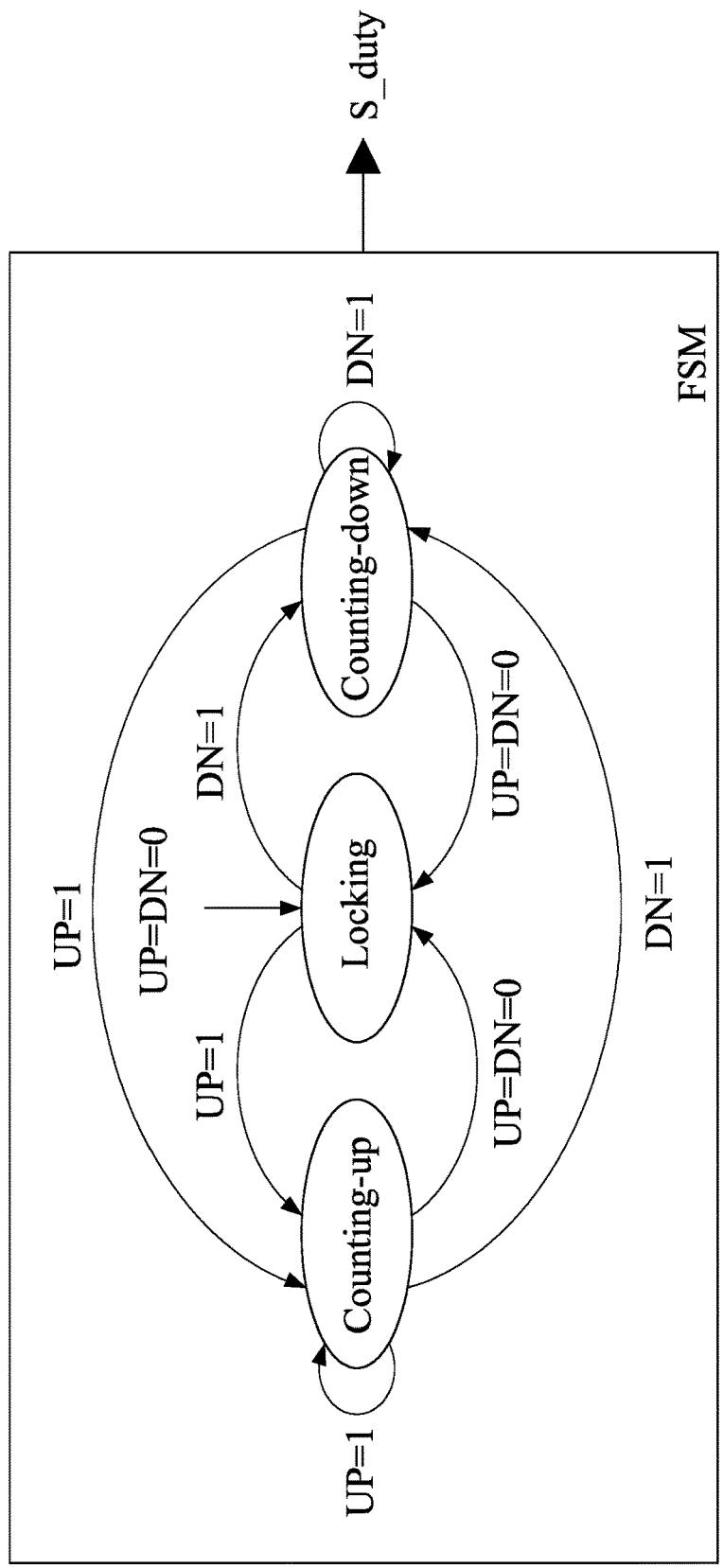
FIG. 9 is a schematic diagram illustrating operation of a finite state machine (FSM) of the embodiment.

The FSM 3310 is coupled to the phase detector module receiving the counting-up signal (UP) and the counting-down signal (DN) therefrom, receives the clock signal (Ex_clock), and is configured to switch a current state thereof among a counting-up state, a counting-down state and a locking state, and to output a duty-cycle indication signal (S_duty) indicating a duty-cycle indication number based on the current state. It is noted that the clock signal (Ex_clock) is the reference signal (S_ref) in this embodiment, but this disclosure is not limited in this respect. Further referring to FIG. 9, upon receipt of a trigger (e.g., a rising edge or a falling edge of the reference signal (S_ref)) and in a condition that the current state is the locking state, the FSM 3310 switches the current state to the counting-up state and adds one to the duty-cycle indication number when the counting-up signal (UP) is at the first logic level (logic high in this embodiment) and the counting-down signal (DN) is at the second logic level (logic low in this embodiment), and switches the current state to the counting-down state and subtracts one from the duty-cycle indication number when the counting-up signal (UP) is at the second logic level and the counting-down signal (DN) is at the first logic level. Upon receipt of a trigger and in a condition that the current state is the counting-up state, the FSM 3310 switches the current state to the locking state and maintains the duty-cycle indication number when both the counting-up signal (UP) and the counting-down signal (DN) are at the second logic level, switches the current state to the counting-down state and subtracts one from the duty-cycle indication number when the counting-down signal (DN) is at the first logic level, and maintains the current state at the counting-up state and adds one to the duty-cycle indication number when the counting-up signal (UP) is at the first logic level. Upon receipt of a trigger and in a condition that the current state is the counting-down state, the FSM 3310 switches the current state to the locking state and maintains the duty-cycle indication number when both the counting-up signal (UP) and the counting-down signal (DN) are at the second logic level, switches the current state to the counting-up state and adds one to the duty-cycle indication number when the counting-up signal (UP) is at the first logic level, and maintains the current state at the counting-down state and subtracts one from the duty-cycle indication number when the counting-down signal (DN) is at the first logic level. It is noted that, in this embodiment, the FSM 3310 may not refresh the duty-cycle indication signal (S_duty) at every trigger, but may refresh the duty-cycle indication signal (S_duty) with a latest duty-cycle indication number every predetermined number of the triggers based on a number of bits that are used to represent the duty-cycle indication number, so that the following circuit of this embodiment may correctly operate as desired. For example, in a case that the duty-cycle indication signal (S_duty) is an n-bit signal to represent the duty-cycle indication number, the FSM 3310 refreshes the duty-cycle indication signal (S_duty) with the latest duty-cycle indication number every $2^n$ triggers.

The counter 3313 receives the reference signal (S_ref), and is configured to output a counter signal that indicates a counter number, and to add one to the counter number for each period of the reference signal (S_ref). In this embodiment, the counter signal has a bit number equaling that of the duty-cycle indication signal (S_duty).

The comparator 3311 has a first input terminal disposed to receive a signal indicating a number of zero, a second input terminal coupled to the counter 3313 to receive the counter signal, and an output terminal to output a first comparator signal indicating whether or not the counter number is equal to zero. In this embodiment, the comparator 3311 outputs a signal (S_set) of logic high when the counter number is equal to zero, and outputs the signal (S_set) of logic low when otherwise.

The comparator 3312 has a first input terminal coupled to the counter 3313 to receive the counter signal, a second terminal coupled to the FSM 3310 for receiving the duty-cycle indication signal (S_duty) therefrom, and an output terminal to output a second comparator signal indicating whether or not the counter number is equal to the duty-cycle indication number. In this embodiment, the comparator 3312 outputs a signal (S_reset) of logic high when the counter number is equal to the duty-cycle indication number, and outputs the signal (S_reset) of logic low when otherwise.

The SR latch 3314 has two input terminals (S, R) respectively coupled to the output terminals of the comparators 3311, 3312, and an output terminal at which the PWM signal (CK_buck) is provided.

Figure 10:
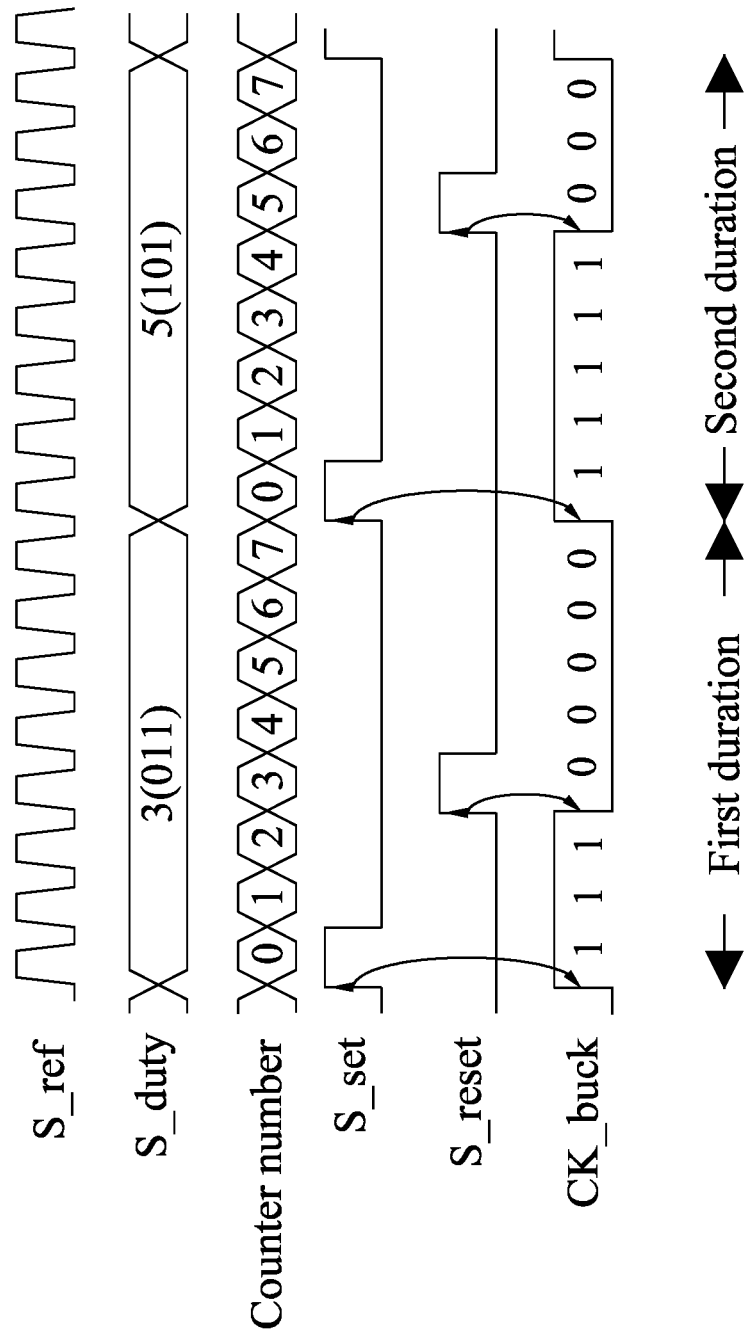
FIG. 10 is a timing diagram illustrating an exemplary operation of the PWM controller.

Further referring to FIG. 10, the duty-cycle indication number indicated by the duty-cycle indication signal (S_duty) is exemplified to be "3" (i.e., "011" in binary) in the first duration, and "5" (i.e., "101" in binary) in the second duration, where each of the first duration and the second duration corresponds to eight ($=2^3$) triggers for the FSM 3310 (i.e., equals to eight periods of the reference signal (S_ref) that serves as the clock signal (Ex_clock) for the PWM controller 331 in this embodiment).

In the beginning of the first duration where the duty-cycle indication number is three, the counter number is zero, so the comparator 3311 outputs the signal (S_set) of logic high and the comparator 3312 outputs the signal (S_reset) of logic low, causing the SR latch 3314 to output the PWM signal (CK_buck) of logic high. During the time when the counter number equals one or two in the first duration, the comparator 3311 outputs the signal (S_set) of logic low and the comparator 3312 outputs the signal (S_reset) of logic low, causing the SR latch 3314 to maintain the PWM signal (CK_buck) at logic high. When the counter number is increased to three in the first duration, the comparator 3311 outputs the signal (S_set) of logic low and the comparator 3312 outputs the signal (S_reset) of logic high, causing the SR latch 3314 to output the PWM signal (CK_buck) of logic low. During the time when the counter number equals four, five, six or seven in the first duration, the comparator 3311 outputs the signal (S_set) of logic low and the comparator 3312 outputs the signal (S_reset) of logic low, causing the SR latch 3314 to maintain the PWM signal (CK_buck) at logic low. As a result, the PWM signal (CK_buck) is outputted as "1, 1, 1, 0, 0, 0, 0, 0" in sequence for the eight periods of the reference signal (S_ref) in the first duration.

In the beginning of the second duration where the duty-cycle indication number is five, the counter number is zero, so the comparator 3311 outputs the signal (S_set) of logic high and the comparator 3312 outputs the signal (S_reset) of logic low, causing the SR latch 3314 to output the PWM signal (CK_buck) of logic high. During the time when the counter number equals one, two, three or four in the second duration, the comparator 3311 outputs the signal (S_set) of logic low and the comparator 3312 outputs the signal (S_reset) of logic low, causing the SR latch 3314 to maintain the PWM signal (CK_buck) at logic high. When the counter number is increased to five in the second duration, the comparator 3311 outputs the signal (S_set) of logic low and the comparator 3312 outputs the signal (S_reset) of logic high, causing the SR latch 3314 to output the PWM signal (CK_buck) of logic low. During the time when the counter number equals six or seven in the second duration, the comparator 3311 outputs the signal (S_set) of logic low and the comparator 3312 outputs the signal (S_reset) of logic low, causing the SR latch 3314 to maintain the PWM signal (CK_buck) at logic low. As a result, the PWM signal (CK_buck) is outputted as "1, 1, 1, 1, 1, 0, 0, 0" in sequence for the eight periods of the reference signal (S_ref) in the second duration.

Referring to FIG. 2 again, the switching controller 332 is coupled to the PWM controller 331 for receiving the PWM signal (CK_buck) therefrom, is coupled to the power conversion circuit 2 for providing the first and second control signals (CKP, CKN) thereto and for receiving a voltage (Vx) at the first terminal of the inductor (Lo), and is configured to generate the first and second control signals (CKP, CKN) based on the PWM signal (CK_buck) and the voltage (Vx). In one embodiment, for the design of the switching controller 332, reference may be made to "A 0.6V Input CCM/DCM Operating Digital Buck Converter in 40 nm CMOS, IEEE Journal of Solid-State Circuits, vol. 49, no. 11, November 2014", which enables automatic selection between DCM (discontinuous conduction mode) operation adapted for light load conditions, and CCM (continuous conduction mode) adapted for heavy load conditions.

In summary, by virtue of the proposed configuration of the phase detector module 32 according to this disclosure, the counting-up signal is maintained at the first logic level when the frequency of the reference signal is higher than the frequency of the feedback signal, and the counting-down signal is maintained at the first logic level when the frequency of the reference signal is lower than the frequency of the feedback signal, thereby reducing power consumption that may occur at switching of the logic level of each of the counting-up signal and the counting-down signal, and promoting operation efficiency of the feedback control circuit 3 and the power converter that uses the feedback control circuit 3.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A power converter, comprising:
a power conversion circuit disposed to receive a control input and an input voltage, and configured to convert the input voltage into an output voltage that has a magnitude relating to the control input; and
a feedback control circuit including:
    a voltage detector module coupled to said power conversion circuit for receiving the output voltage therefrom, and configured to generate a feedback signal having a frequency proportional to the magnitude of the output voltage;
    a phase detector module coupled to said voltage detector module for receiving the feedback signal therefrom, disposed to receive a reference signal having a reference frequency, and configured to
        generate a counting-up signal at a first logic level and a counting-down signal at a second logic level that is different from the first logic level when the reference frequency is higher than the frequency of the feedback signal, where the counting-up signal remains at the first logic level and the counting-down signal remains at the second logic level until the reference frequency becomes not higher than the frequency of the feedback signal, and
        generate the counting-up signal at the second logic level and the counting-down signal at the first logic level when the reference frequency is lower than the frequency of the feedback signal, where the counting-up signal remains at the second logic level and the counting-down signal remains at the first logic level until the reference frequency becomes not lower than the frequency of the feedback signal; and
    a control input generator module coupled to said phase detector module for receiving the counting-up signal and the counting-down signal therefrom, and configured to generate the control input based on the counting-up signal and the counting-down signal.

2. The power converter of claim 1, wherein said phase detector module includes:
a first D flip-flop having an input terminal disposed to receive a signal at the first logic level, a clock terminal disposed to receive the reference signal, a reset terminal, and an output terminal;
a first NOT gate having an input terminal coupled to said clock terminal of said first D flip-flop, and an output terminal;
a second D flip-flop having an input terminal disposed to receive a signal at the first logic level, a clock terminal coupled to said voltage detector module for receiving the feedback signal therefrom, a reset terminal coupled to said reset terminal of said first D flip-flop, and an output terminal;
a second NOT gate having an input terminal coupled to said clock terminal of said second D flip-flop, and an output terminal;
a third D flip-flop having an input terminal coupled to said output terminal of said first D flip-flop, a clock terminal coupled to said output terminal of said first NOT gate, and an output terminal at which the counting-up signal is provided;
a fourth D flip-flop having an input terminal coupled to said output terminal of said second D flip-flop, a clock terminal coupled to said output terminal of said second NOT gate, and an output terminal at which the counting-down signal is provided; and
a NAND gate having a first input terminal coupled to said output terminal of said first D flip-flop, a second input terminal coupled to said output terminal of said second D flip-flop, and an output terminal coupled to said reset terminal of said first D flip-flop.

3. The power converter of claim 2, wherein said control input generator module includes:
a pulse width modulation (PWM) controller coupled to said phase detector module for receiving the counting-up signal and the counting-down signal therefrom, disposed to receive a clock signal, and configured to generate a PWM signal based on the counting-up signal, the counting-down signal and the clock signal; and
a switching controller coupled to said PWM controller for receiving the PWM signal therefrom, coupled to said power conversion circuit for providing the control input thereto, and configured to generate the control input based on the PWM signal.

4. The power converter of claim 3, wherein the control input includes a first control signal and a second control signal, and said power conversion circuit includes:
a first switch having a first terminal disposed to receive the input voltage, a second terminal, and a control terminal coupled to said switching controller for receiving the first control signal therefrom;
a second switch having a first terminal coupled to said second terminal of said first switch, a second terminal, and a control terminal coupled to said switching controller for receiving the second control signal therefrom; and
an inductor having a first terminal coupled to said second terminal of said first switch, and a second terminal at which the output voltage is provided.

5. The power converter of claim 4, wherein said first switch is a P-type metal-oxide-semiconductor field-effect transistor (MOSFET) having a source terminal serving as said first terminal thereof, a drain terminal serving as said second terminal thereof, and a gate terminal serving as said control terminal thereof; and
wherein said second switch is an N-type MOSFET having a source terminal serving as said first terminal thereof, a drain terminal serving as said second terminal thereof, and a gate terminal serving as said control terminal thereof.

6. The power converter of claim 3, wherein said PWM controller includes:
a finite state machine (FSM) coupled to said phase detector module for receiving the counting-up signal and the counting-down signal therefrom, and configured to switch a current state thereof among a counting-up state, a counting-down state and a locking state, and to output a duty-cycle indication signal indicating a duty-cycle indication number based on the current state;
wherein, upon receipt of a trigger and in a condition that the current state is the locking state, said FSM switches the current state to the counting-up state and adds one to the duty-cycle indication number when the counting-up signal is at the first logic level and the counting-down signal is at the second logic level, and switches the current state to the counting-down state and subtracts one from the duty-cycle indication number when the counting-up signal is at the second logic level and the counting-down signal is at the first logic level;
wherein, upon receipt of a trigger and in a condition that the current state is the counting-up state, said FSM switches the current state to the locking state and maintains the duty-cycle indication number when both the counting-up signal and the counting-down signal are at the second logic level, and maintains the current state at the counting-up state and adds one to the duty-cycle indication number when the counting-up signal is at the first logic level; and
wherein, upon receipt of a trigger and in a condition that the current state is the counting-down state, said FSM switches the current state to the locking state and maintains the duty-cycle indication number when both the counting-up signal and the counting-down signal are at the second logic level, and maintains the current state at the counting-down state and subtracts one from the duty-cycle indication number when the counting-down signal is at the first logic level;
wherein said PWM controller further includes:
a counter disposed to receive the reference signal, and configured to output a counter signal that indicates a counter number, and to add one to the counter number for each period of the reference signal;
a first comparator having a first input terminal disposed to receive a signal indicating a number of zero, a second input terminal coupled to said counter to receive the counter signal, and an output terminal to output a first comparator signal indicating whether or not the counter number is equal to zero;
a second comparator having a first input terminal coupled to said counter to receive the counter signal, a second terminal coupled to said FSM for receiving the duty-cycle indication signal therefrom, and an output terminal to output a second comparator signal indicating whether or not the counter number is equal to the duty-cycle indication number; and
an SR latch having two input terminals respectively coupled to said output terminals of said first and second comparators, and an output terminal at which the PWM signal is provided.

7. A feedback control circuit for use with a power conversion circuit configured to convert an input voltage into an output voltage that has a magnitude relating to a control input received thereby, said feedback control circuit comprising:
a voltage detector module to be coupled to the power conversion circuit for receiving the output voltage therefrom, and configured to generate a feedback signal having a frequency proportional to the magnitude of the output voltage;
a phase detector module coupled to said voltage detector module for receiving the feedback signal therefrom, disposed to receive a reference signal having a reference frequency, and configured to
generate, when the reference frequency is higher than the frequency of the feedback signal, a counting-up signal at a first logic level and a counting-down signal at a second logic level that is different from the first logic level, where the counting-up signal remains at the first logic level and the counting-down signal remains at the second logic level until the reference frequency becomes not higher than the frequency of the feedback signal, and
generate the counting-up signal at the second logic level and the counting-down signal at the first logic level when the reference frequency is lower than the frequency of the feedback signal, where the counting-up signal remains at the second logic level and the counting-down signal remains at the first logic level until the reference frequency becomes not lower than the frequency of the feedback signal; and
a control input generator module coupled to said phase detector module for receiving the counting-up signal and the counting-down signal therefrom, and configured to generate, based on the counting-up signal and the counting-down signal, the control input to be received by the power conversion circuit.

8. The feedback control circuit of claim 7, wherein said phase detector module includes:
a first D flip-flop having an input terminal disposed to receive a signal at the first logic level, a clock terminal disposed to receive the reference signal, a reset terminal, and an output terminal;
a first NOT gate having an input terminal coupled to said clock terminal of said first D flip-flop, and an output terminal;
a second D flip-flop having an input terminal disposed to receive a signal at the first logic level, a clock terminal coupled to said voltage detector module for receiving the feedback signal therefrom, a reset terminal coupled to said reset terminal of said first D flip-flop, and an output terminal;
a second NOT gate having an input terminal coupled to said clock terminal of said second D flip-flop, and an output terminal;
a third D flip-flop having an input terminal coupled to said output terminal of said first D flip-flop, a clock terminal coupled to said output terminal of said first NOT gate, and an output terminal at which the counting-up signal is provided;
a fourth D flip-flop having an input terminal coupled to said output terminal of said second D flip-flop, a clock terminal coupled to said output terminal of said second NOT gate, and an output terminal at which the counting-down signal is provided; and
a NAND gate having a first input terminal coupled to said output terminal of said first D flip-flop, a second input terminal coupled to said output terminal of said second D flip-flop, and an output terminal coupled to said reset terminal of said first D flip-flop.

9. The feedback control circuit of claim 8, wherein said control input generator module includes:
a pulse width modulation (PWM) controller coupled to said phase detector module for receiving the counting-up signal and the counting-down signal therefrom, disposed to receive a clock signal, and configured to generate a PWM signal based on the counting-up signal, the counting-down signal and the clock signal; and
a switching controller coupled to said PWM controller for receiving the PWM signal therefrom, and configured to generate the control input based on the PWM signal.

10. The feedback control circuit of claim 9, wherein said PWM controller includes:
a finite state machine (FSM) coupled to said phase detector module for receiving the counting-up signal and the counting-down signal therefrom, and configured to switch a current state thereof among a counting-up state, a counting-down state and a locking state, and to output a duty-cycle indication signal indicating a duty-cycle indication number based on the current state;
wherein, upon receipt of a trigger and in a condition that the current state is the locking state, said FSM switches the current state to the counting-up state and adds one to the duty-cycle indication number when the counting-up signal is at the first logic level and the counting-down signal is at the second logic level, and switches the current state to the counting-down state and subtracts one from the duty-cycle indication number when the counting-up signal is at the second logic level and the counting-down signal is at the first logic level;
wherein, upon receipt of a trigger and in a condition that the current state is the counting-up state, said FSM switches the current state to the locking state and maintains the duty-cycle indication number when both the counting-up signal and the counting-down signal are at the second logic level, and maintains the current state at the counting-up state and adds one to the duty-cycle indication number when the counting-up signal is at the first logic level; and
wherein, upon receipt of a trigger and in a condition that the current state is the counting-down state, said FSM switches the current state to the locking state and maintains the duty-cycle indication number when both the counting-up signal and the counting-down signal are at the second logic level, and maintains the current state at the counting-down state and subtracts one from the duty-cycle indication number when the counting-down signal is at the first logic level;
wherein said PWM controller further includes:
a counter disposed to receive the reference signal, and configured to output a counter signal that indicates a counter number, and to add one to the counter number for each period of the reference signal;
a first comparator having a first input terminal disposed to receive a signal indicating a number of zero, a second input terminal coupled to said counter to receive the counter signal, and an output terminal to output a first comparator signal indicating whether or not the counter number is equal to zero;

a second comparator having a first input terminal coupled to said counter to receive the counter signal, a second terminal coupled to said FSM for receiving the duty-cycle indication signal therefrom, and an output terminal to output a second comparator signal indicating whether or not the counter number is equal to the duty-cycle indication number; and an SR latch having two input terminals respectively coupled to said output terminals of said first and second comparators, and an output terminal at which the PWM signal is provided.

11. A phase detector for use in a power converter configured to convert an input voltage into an output voltage that has a magnitude which is adjustable in relation to a counting-up signal and a counting-down signal, said phase detector comprising:

a first D flip-flop having an input terminal disposed to receive a signal at a first logic level, a clock terminal disposed to receive a reference signal, a reset terminal, and an output terminal;

a first NOT gate having an input terminal coupled to said clock terminal of said first D flip-flop, and an output terminal;

a second D flip-flop having an input terminal disposed to receive a signal at the first logic level, a clock terminal disposed to receive a target signal, a reset terminal coupled to said reset terminal of said first D flip-flop, and an output terminal;

a second NOT gate having an input terminal coupled to said clock terminal of said second D flip-flop, and an output terminal;

a third D flip-flop having an input terminal coupled to said output terminal of said first D flip-flop, a clock terminal coupled to said output terminal of said first NOT gate, and an output terminal at which a counting-up signal is provided;

a fourth D flip-flop having an input terminal coupled to said output terminal of said second D flip-flop, a clock terminal coupled to said output terminal of said second NOT gate, and an output terminal at which a counting-down signal is provided; and a NAND gate having a first input terminal coupled to said output terminal of said first D flip-flop, a second input terminal coupled to said output terminal of said second D flip-flop, and an output terminal coupled to said reset terminal of said first D flip-flop.

* * * * *